(12) United States Patent
Bossemeyer, Jr.

(10) Patent No.: US 7,356,134 B2
(45) Date of Patent: Apr. 8, 2008

(54) METHOD OF ACCESSING A DIAL-UP SERVICE

(75) Inventor: Robert Wesley Bossemeyer, Jr., St. Charles, IL (US)

(73) Assignee: SBC Properties, L.P., Reno, NV (US)

(*) Notice: Subject to any disclaimer, the term of this patent is extended or adjusted under 35 U.S.C. 154(b) by 49 days.

(21) Appl. No.: 11/004,287

(22) Filed: Dec. 3, 2004

(65) Prior Publication Data
US 2005/0080624 A1 Apr. 14, 2005

Related U.S. Application Data

(63) Continuation of application No. 08/863,462, filed on May 27, 1997, now Pat. No. 6,847,717.

(51) Int. Cl.
*H04M 11/00* (2006.01)

(52) U.S. Cl. .................. 379/93.03; 379/88.02

(58) Field of Classification Search ...............
379/355.01–355.04, 355.1, 355.09, 88, 88.02,
379/88.03, 189, 199, 142.01; 704/206–208,
704/246, 251, 271–273; 381/42, 43
See application file for complete search history.

(56) References Cited

U.S. PATENT DOCUMENTS

| | | | |
|---|---|---|---|
| 4,590,605 A | 5/1986 | Hataoka et al. |
| 4,653,097 A | 3/1987 | Watanabe et al. |
| 5,054,053 A | 10/1991 | Sakanishi et al. |
| 5,121,428 A | 6/1992 | Uchiyama et al. |
| 5,127,043 A | 6/1992 | Hunt et al. |

(Continued)

OTHER PUBLICATIONS

Submitted herewith is the Written Opinion from the International Preliminary Examining Authority for International application No. PCT/US98/09705 dated Aug. 25, 1999, 8 pages.

(Continued)

*Primary Examiner*—Stella Woo
(74) *Attorney, Agent, or Firm*—Hanley, Flight & Zimmerman, LLC

(57) ABSTRACT

A method of accessing a dial-up service involves the following steps: (a) dialing a service number (172); (b) speaking a number of digits to form a first utterance (174); (c) recognizing the digits using speaker independent speaker recognition (176); (d) when a user has used the dial-up service previously, verifying the user based on the first utterance using a speaker verification system (178); (e) when the user cannot be verified, requesting the user enter a personal identification number (182); and (f) when the personal identification number is valid (184), providing access to the dial-up service (186).

35 Claims, 7 Drawing Sheets

U.S. PATENT DOCUMENTS

| | | | |
|---|---|---|---|
| 5,181,238 A * | 1/1993 | Medamana et al. | 379/93.03 |
| 5,216,720 A | 6/1993 | Naik et al. | |
| 5,297,194 A * | 3/1994 | Hunt et al. | 379/88.02 |
| 5,365,574 A | 11/1994 | Hunt et al. | |
| 5,384,833 A * | 1/1995 | Cameron | 379/88.01 |
| 5,414,755 A | 5/1995 | Bahler et al. | |
| 5,479,490 A | 12/1995 | Nakashima | |
| 5,499,288 A | 3/1996 | Hunt et al. | |
| 5,517,558 A | 5/1996 | Schalk | |
| 5,581,600 A | 12/1996 | Watts et al. | |
| 5,717,738 A * | 2/1998 | Gammel | 704/270 |
| 5,719,921 A | 2/1998 | Vysotsky et al. | |
| 5,732,394 A | 3/1998 | Nakadai et al. | |
| 5,752,231 A | 5/1998 | Gammel et al. | |
| 5,799,276 A | 8/1998 | Komissarchik et al. | |
| 5,835,894 A * | 11/1998 | Adcock et al. | 704/273 |
| 5,890,108 A | 3/1999 | Yeldener | |
| 5,897,616 A | 4/1999 | Kanevsky et al. | |
| 6,076,055 A * | 6/2000 | Bossemeyer et al. | 704/250 |
| 6,556,127 B1 * | 4/2003 | Moser et al. | 704/273 |
| 6,847,717 B1 * | 1/2005 | Bossemeyer, Jr. | 379/355.01 |

OTHER PUBLICATIONS

Submitted herewith is the International Preliminary Examination Report from the International Preliminary Examining Authority for International application No. PCT/US98/09705 dated Jan. 18, 2000, 9 pages.

Submitted herewith is the International Search Report for International application No. PCT/US98/09705 dated Sep. 28, 1998, 3 pages.

* cited by examiner

METHOD OF ACCESSING A DIAL-UP SERVICE

The present invention is a continuation of Ser. No. 08/863,462 now, the U.S. Pat. No. 6,847,717 B1, filed on May 27, 1997 and issued on Jan. 25, 2005.

FIELD OF THE INVENTION

The present invention is related to the field of speech recognition systems and more particularly to a speaker verification method.

BACKGROUND OF THE INVENTION

Speech recognition and speaker verification use similar analysis tools to achieve its goals. An input utterance is first processed to determine its essential characteristics. Typically, input utterances are converted to cepstrum coefficients. A cepstrum is an inverse Fourier transform of the log power spectrum. In a training phase the cepstrum coefficients are saved to form code books for specific utterances. For instance, a code book might have codes for the numeral zero through nine. In speech recognition, an input utterance is compared to the codes (training utterances) in the code book to determine which is most similar. In speech recognition the code is a generalized representation of many people's way of forming an utterance (e.g., "zero"). In speaker verification the codes represent the individual characteristics of the speaker and the verification system tries determine if a person's code is more similar to an input utterance, than an impostor code. As a result the codes in a speaker verification system emphasis individual characteristics, while in a speech recognition system the codes generalize over many individual speakers. Speaker verification has potential applications in a number of voice activated systems, such as banking over the telephone. Unfortunately, present speaker verification systems have not proven reliable enough for these applications.

Thus there exists a need for a dial-up service that can be used with today's speaker verifications systems capabilities and profit by the incorporation of advanced speaker verification systems.

SUMMARY OF THE INVENTION

A method of accessing a dial-up service that meets these goals involves the following steps: (a) dialing a service number; (b) speaking a number of digits to form a first utterance; (c) recognizing the digits using speaker independent speaker recognition; (d) when a user has used the dial-up service previously, verifying the user based on the first utterance using a speaker verification system; (e) when the user cannot be verified, requesting the user enter a personal identification number; and (f) when the personal identification number is valid, providing access to the dial-up service.

DETAILED DESCRIPTION OF THE DRAWINGS

Figure 1:
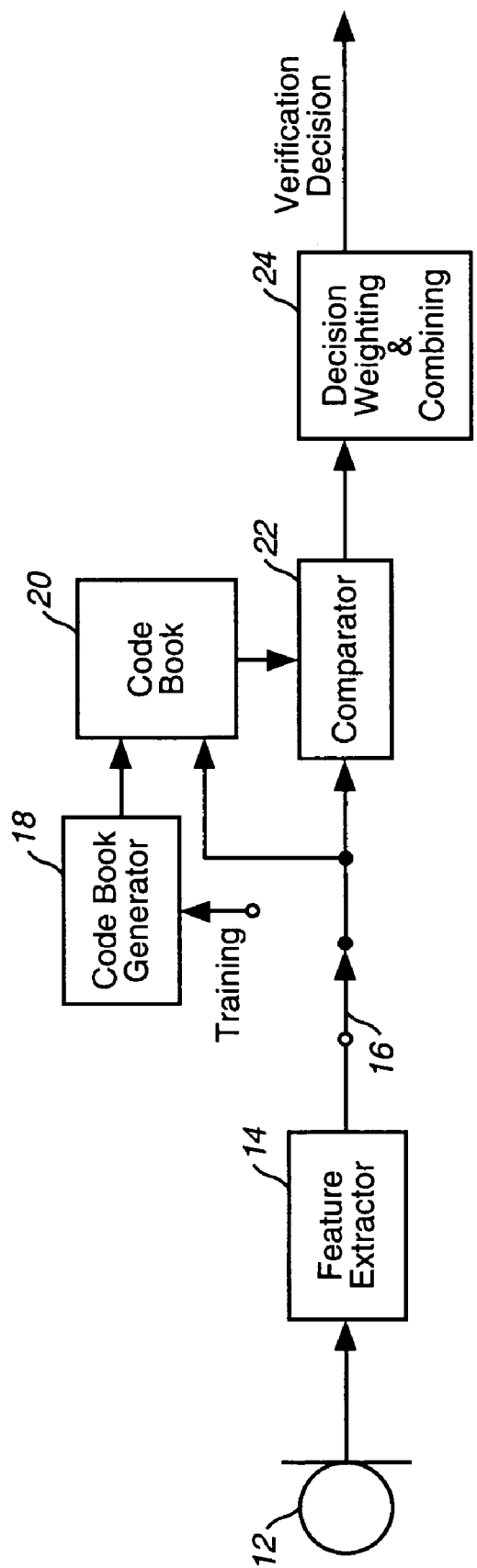
FIG. 1 is a block diagram of an embodiment of a speaker verification system.

Several improvements in speaker verification methods are described and then a dial-up service that can incorporate these improvements is explained. FIG. 1 is a block diagram of an embodiment of a speaker verification system 10. It is important to note that the speaker verification system can be physically implemented in a number of ways. For instance, the system can be implemented as software in a general purpose computer connected to a microphone; or the system can be implemented as firmware in a general purpose microprocessor connected to memory and a microphone; or the system can be implemented using a Digital Signal Processor (DSP), a controller, a memory, and a microphone controlled by the appropriate software. Note that since the process can be performed using software in a computer, then a computer readable storage medium containing computer readable instructions can be used to implement the speaker verification method. These various system architectures are apparent to those skilled in the art and the particular system architecture selected will depend on the application.

A microphone 12 receives an input speech and converts the sound waves to an electrical signal. A feature extractor 14 analyzes the electrical signal and extracts key features of the speech. For instance, the feature extractor first digitizes the electrical signal. A cepstrum of the digitized signal is then performed to determine the cepstrum coefficients. In another embodiment, a linear predictive analysis is used to find the linear predictive coding (LPC) coefficients. Other feature extraction techniques are also possible.

A switch 16 is shown attached to the feature extractor 14. This switch 16 represents that a different path is used in the training phase than in the verification phase. In the training phase the cepstrum coefficients are analyzed by a code book generator 18. The output of the code book generator 18 is stored in the code book 20. In one embodiment, the code book generator 18 compares samples of the same utterance from the same speaker to form a generalized representation of the utterance for that person. This generalized representation is a training utterance in the code book. The training utterance represents the generalized cepstrum coefficients of a user speaking the number "one" as an example. A training utterance could also be a part of speech, a phoneme, or a number like "twenty one" or any other segment of speech. In addition to the registered users' samples, utterances are taken from a group of non-users. These utterances are used to form a composite that represents an impostor code having a plurality of impostor utterances.

In one embodiment, the code book generator 18 determines whether the speaker (users and non-users) is male or female. The male training utterances (male group) are aggregated to determining a male variance vector. The female training utterances (female group) are aggregated to determine a female variance vector. These gender specific variance vectors will be used when calculating a weighted Euclidean distance (measure of closeness) in the verification phase.

In the verification phase the switch 16 connects the feature extractor 14 to the comparator 22. The comparator 22 performs a mathematical analysis of the closeness between a test utterance from a speaker with a training utterance stored in the code book 20 and between the test utterance and an impostor utterance. In one embodiment, a test utterance such as a spoken "one" is compared with the "one" training utterance for the speaker and the "one" impostor utterance. The comparator 22 determines a measure of closeness between the "one" training utterances the "one" test utterance and the "one" impostor utterance. When the test utterance is closer to the training utterance than the impostor utterance, the speaker is verified as the true speaker. Otherwise the speaker is determined to be an impostor. In one embodiment, the measure of closeness is a modified weighted Euclidean distance. The modification in one embodiment involves using a generalized variance vector instead of an individual variance vector for each of the registered users. In another embodiment, a male variance vector is used for male speakers and a female variance vector is used for a female speaker.

A decision weighting and combining system 24 uses the measure of closeness to determine if the test utterance is closest to the training utterance or the impostor utterance. When the test utterance is closer to the training utterance than the impostor utterance, a verified decision is made. When the test utterance is not closer to the training utterance than the impostor utterance, an un-verified decision is made. These are preliminary decisions. Usually, the speaker is required to speak several utterances (e.g., "one", "three", "five", "twenty one"). A decision is made for each of these test utterances. Each of the plurality of decisions is weighted and combined to form the verification decision.

The decisions are weighted because not all utterances provide equal reliability. For instance, "one" could provide a much more reliable decision than "eight". As a result, a more accurate verification decision can be formed by first weighting the decisions based on the underlying utterance. Two weighting methods can be used. One weighting method uses a historical approach. Sample utterances are compared to the training utterances to determine a probability of false alarm $P_{FA}$ (speaker is not impostor but the decision is impostor) and a probability of miss $P_M$ (speaker is impostor but the decision is true speaker). The $P_{FA}$ and $P_M$ are probability of errors. These probability of errors are used to weight each decision. In one embodiment the weighting factors (weight) are described by the equation below:

$$a_i = \log \frac{1 - P_{Mi}}{P_{FAi}} \text{ Decision is Verified (True Speaker)}$$

$$a_i = \log \frac{P_{Mi}}{1 - P_{FAi}} \text{ Decision is Not Verified (Impostor)}$$

When the sum of the weighted decisions is greater than zero, then the verification decision is a true speaker. Otherwise the verification decision is an impostor.

The other method of weighting the decisions is based on an immediate evaluation of the quality of the decision. In one embodiment, this is calculated by using a Chi-Squared detector. The decisions are then weighted on the confidence determined by the Chi-Squared detector. In another embodiment, a large sample approximation is used. Thus if the test statistics are t, find b such that $c^2(b)=t$. Then a decision is an impostor if it exceeds the 1−a quantile of the $c^2$ distribution.

One weighting scheme is shown below:

1.5, if $b > c_{accept}$ 1.0, if $1-a \leq b \leq c_{accept}$

−1.0, if $c_{reject} \leq b \leq 1-a$

−1.25, if $b < c_{reject}$

When the sum of the weighted decisions is greater than zero, then the verification decision is a true speaker. When the sum of the weighted decision is less than or equal to zero, the decision is an impostor.

In another embodiment, the feature extractor 14 segments the speech signal into voiced sounds and unvoiced sounds. Voiced sounds generally include vowels, while most other sounds are unvoiced. The unvoiced sounds are discarded before the cepstrum coefficients are calculated in both the training phase and the verification phase.

These techniques of weighting the decisions, using gender dependent cepstrums and only using voiced sounds can be combined or used separately in a speaker verification system.

Figure 2:
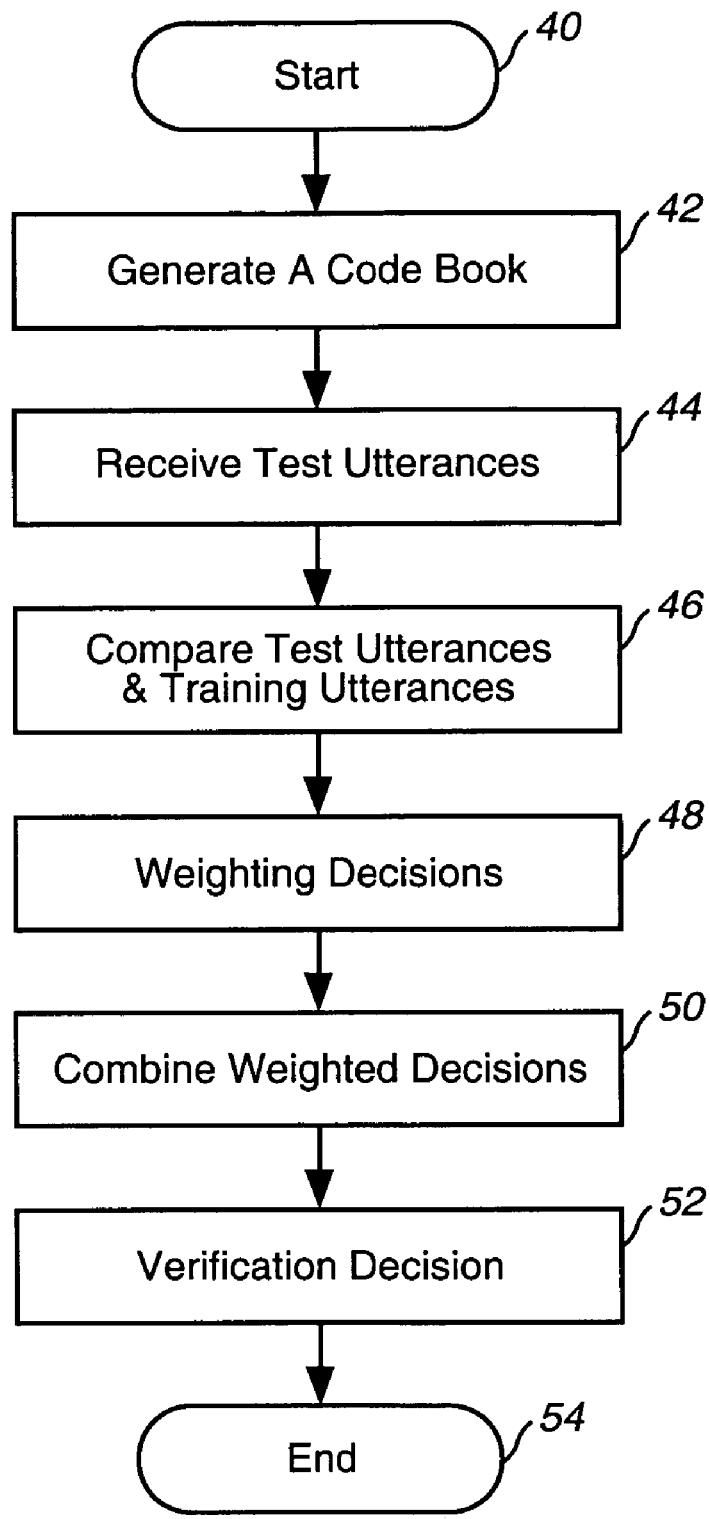
FIG. 2 is a flow chart of an embodiment of the steps used to form a speaker verification decision.

FIG. 2 is a flow chart of an embodiment of the steps used to form a speaker verification decision. The process starts, at step 40, by generating a code book at step 42. The code book has a plurality of training utterances for each the plurality of speakers (registered users, plurality of people) and a plurality of impostor utterances. The training utterances in one embodiment are the cepstrum coefficients for a particular user speaking a particular utterance (e.g., "one"). The training utterances are generated by a user speaking the utterances. The cepstrum coefficients of each of the utterances are determined to form the training utterances. In one embodiment a speaker is asked to repeat the utterance and a generalization of the two utterances is saved as the training utterance. In another embodiment both utterances are saved as training utterances.

In one embodiment, a data base of male speakers is used to determine a male variance vector and a data base of female speakers is used to determine a female variance vector. In another embodiment, the data bases of male and female speakers are used to form a male impostor code book and a female impostor code book. The gender specific variance vectors are stored in the code book. At step 44, a plurality of test utterances (input set of utterances) from a speaker are received. In one embodiment the cepstrum coefficients of the test utterances are calculated. Each of the plurality of test utterances are compared to the plurality of training utterances for the speaker at step 46. Based on the comparison, a plurality of decision are formed, one for each of the plurality of training utterances. In one embodiment, the comparison is determined by a Euclidean weighted distance between the test utterance and the training utterance and between the test utterance and an imposter utterance. In another embodiment, the Euclidean weighted distance is calculated with the male variance vector if the speaker is a male or the female variance vector if the speaker is a female. Each of the plurality of decisions are weighted to form a plurality of weighted decisions at step 48. The weighting can be based on historical error rates for the utterance or based on a confidence level (confidence measure) of the decision for the utterance. The plurality of weighted decisions are combined at step 50. In one embodiment the step of combining involves summing the weighted decisions. A verification decision is then made based on the combined weighted decisions at step 52, ending the process at step 54.

In one embodiment if the sum is greater than zero, the verification decision is the speaker is a true speaker, otherwise the speaker is an impostor.

Figure 3:
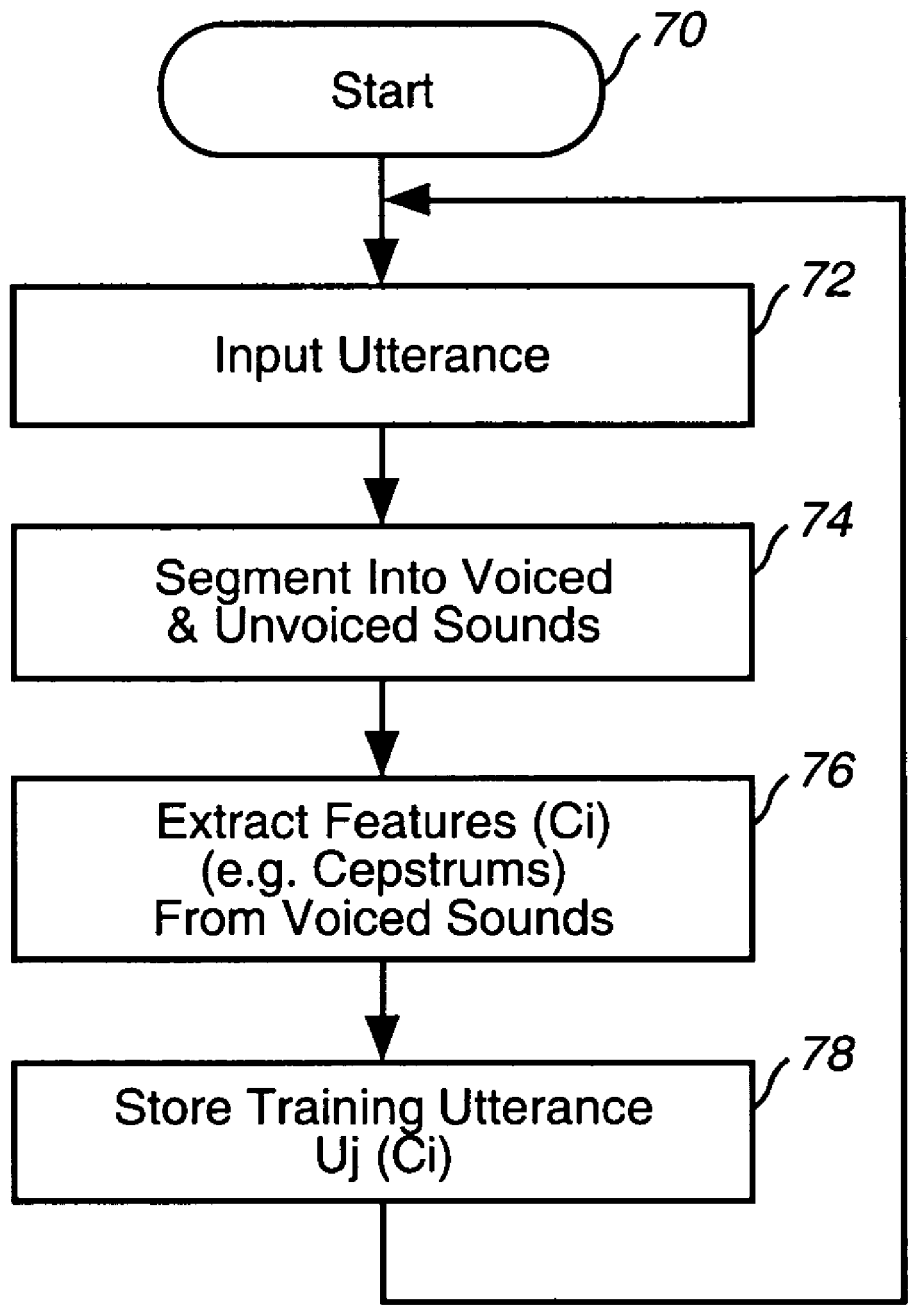
FIG. 3 is a flow chart of an embodiment of the steps used to form a code book for a speaker verification decision.

FIG. 3 is a flow chart of an embodiment of the steps used to form a code book for a speaker verification decision. The process starts, at step 70, by receiving an input utterance at step 72. In one embodiment, the input utterances are then segmented into a voiced sounds and an unvoiced sounds at step 74. The cepstrum coefficients are then calculated using the voiced sounds at step 76. The coefficients are stored as a training utterance for the speaker at step 78. The process then returns to step 72 for the next input utterance, until all the training utterances have been stored in the code book.

Figure 4:
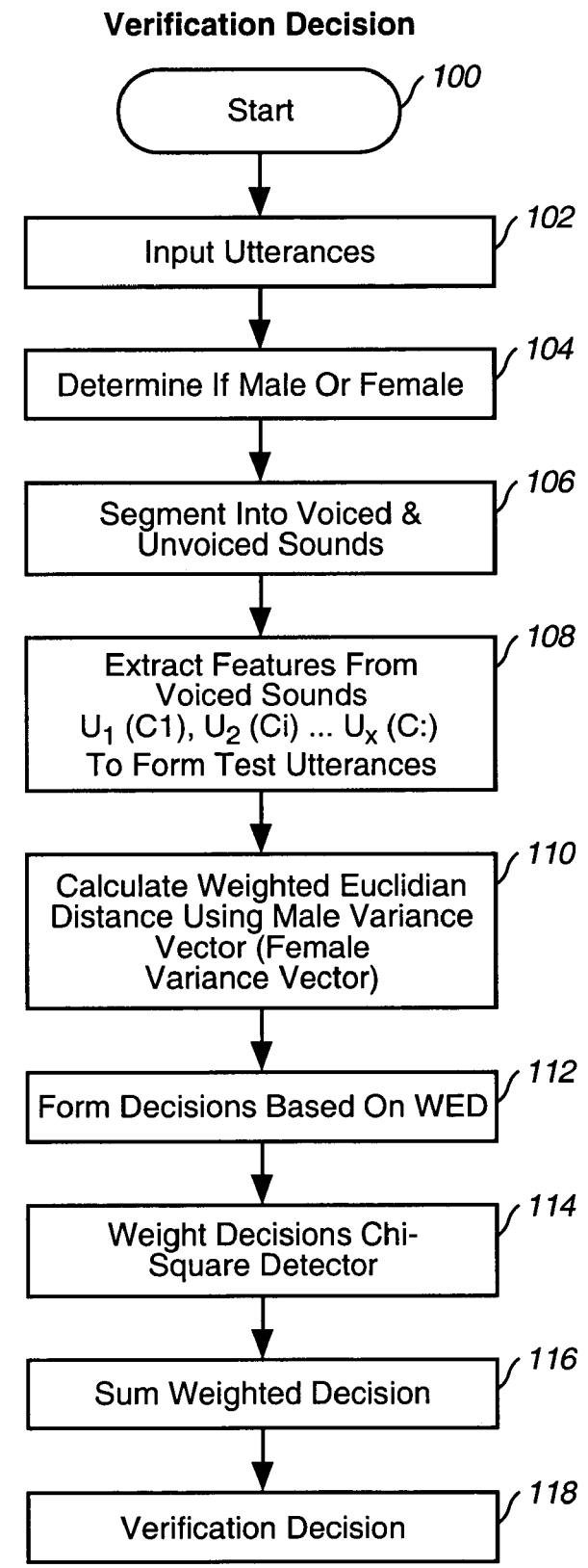
FIG. 4 is a flow chart of an embodiment of the steps used to form a speaker verification decision.

FIG. 4 is a flow chart of an embodiment of the steps used to form a speaker verification decision. The process starts, at step 100, by receiving input utterances at step 102. Next, it is determined if the speaker is male or female at step 104. In a speaker verification application, the speaker purports to be someone in particular. If the person purports to be someone that is a male, then the speaker is assumed to be male even if the speaker is a female. The input utterances are then segmented into a voiced sounds and an unvoiced sounds at step 106. Features (e.g., cepstrum coefficients) are extracted from the voiced sounds to form the test utterances, at step 108. At step 110, the weighted Euclidean distance (WED) is calculated using either a generalized male variance vector if the purported speaker is a male. When the purported speaker is a female, the female variance vector is used. The WED is calculated between the test utterance and the training utterance for the speaker and the test utterance and the male (or female if appropriate) impostor utterance. A decision is formed for each test utterance based on the WED at step 112. The decisions are then weighted based on a confidence level (measure of confidence) determined using a Chi-squared detector at step 114. The weighted decisions are summed at step 116. A verification decision is made based on the sum of the weighted decisions at step 118.

Using the speaker verification decisions discussed above results in an improved speaker verification system, that is more reliable than present techniques.

Figure 5:
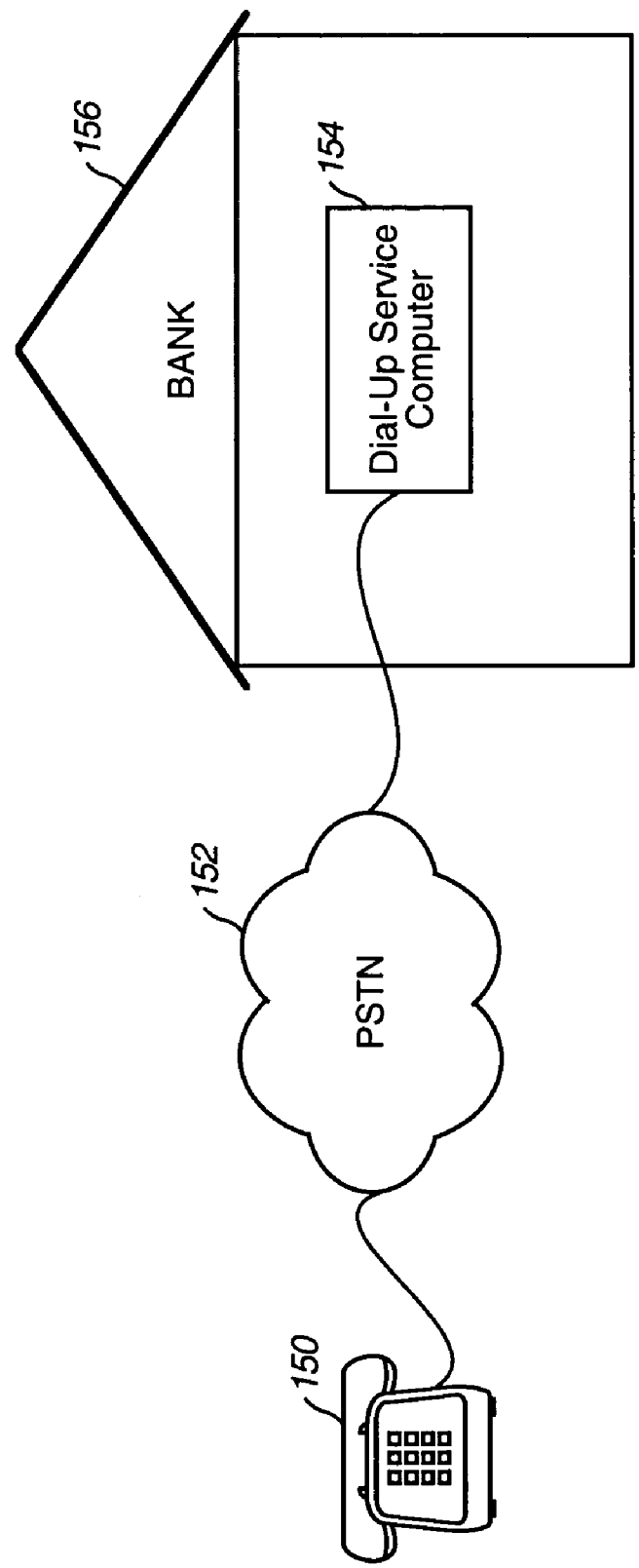
FIG. 5 is a schematic diagram of a dial-up service that incorporates a speaker verification method.
Figure 6:
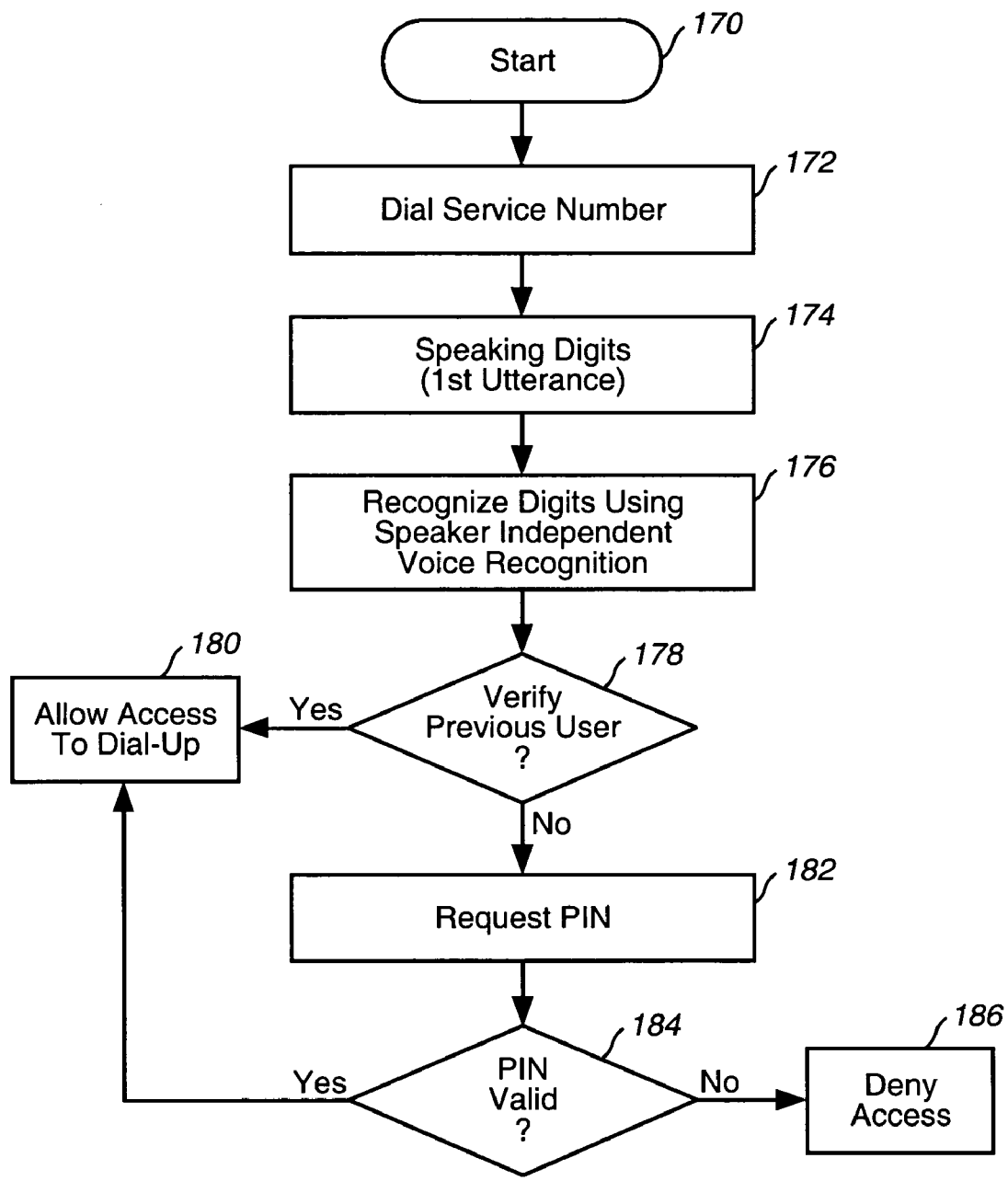
FIG. 6 is a flow chart of an embodiment of the steps used in a dial-up service.

A dial-up service that uses a speaker verification method as described above is shown in FIG. 5. The dial-up service is shown as a banking service. A user dials a service number on their telephone 150. The public switched telephone network (PSTN) 152 then connects the user's phone 150 with a dial-up service computer 154 at a bank 156. The dial-up service need not be located within a bank. The service will be explained in conjunction with the flow chart shown in FIG. 6. The process starts, at step 170, by dialing a service number (communication service address, number) at step 172. The user (requester) is then prompted by the computer 154 to speak a plurality of digits (access code, plurality of numbers, access number) to form a first utterance at step 174. The digits are recognized using speaker independent voice recognition at step 176. When the user has used the dial-up service previously, verifying the user based on the first utterance at step 178. When the user is verified as a true speaker at step 178, allowing access to the dial-up service at step 180. When the user cannot be verified, requesting the user input a personal identification number (PIN) at step 182. The PIN can be entered by the user either by speaking the PIN or by entering the PIN on a keypad. At step 184 it is determined if the PIN is valid. When the PIN is not valid, the user is denied access at step 186. When, the PIN is valid the user is allowed access to the service at step 180. Using the above method the dial-up service uses a speaker verification system as a PIN option, but does not deny access to the user if it cannot verify the user.

Figure 7:
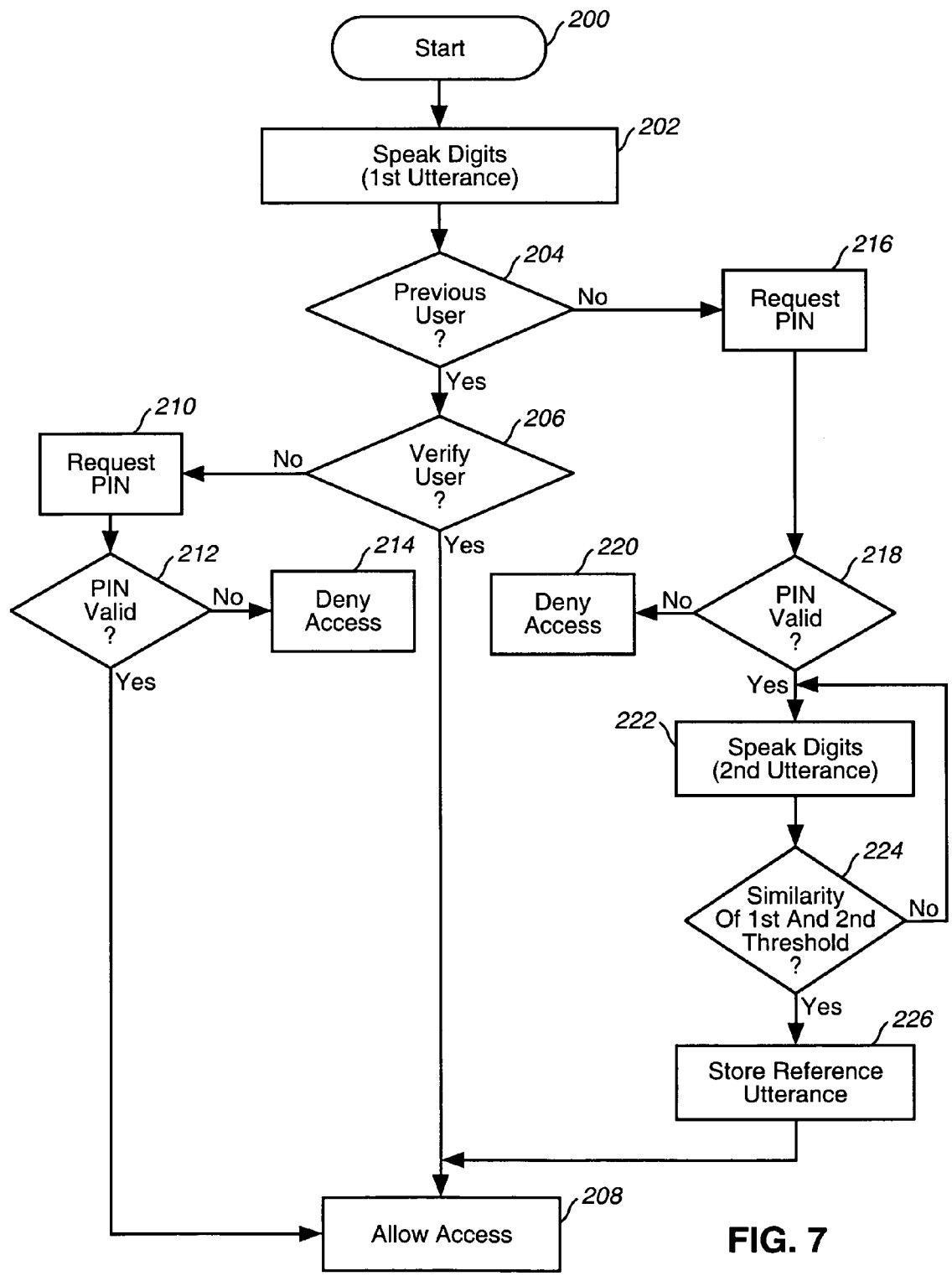
FIG. 7 is a flow chart of an embodiment of the steps used in a dial-up service.

FIG. 7 is a flow chart of another embodiment of the steps used in a dial-up service. The process starts, step 200, by the user speaking an access code to form a plurality of utterances at step 202. At step 204 it is determined if the user has previously accessed the service. When the user has previously used the service, the speaker verification system attempts to verify the user (identity) at step 206. When the speaker verification system can verify the user, the user is allowed access to the system at step 208. When the system cannot verify the user, a PIN is requested at step 210. Note the user can either speak the PIN or enter the PIN on a keypad. At step 212 it is determined if the PIN is valid. When the PIN is not valid the user is denied access at step 214. When the PIN is valid, the, user is allowed access at step 208.

When the user has not previously accessed the communication service at step 204, the user is requested to enter a PIN at step 216. At step 218 it is determined if the, PIN is valid at step 218. When the PIN is not valid, denying access to the service at step 220. When the PIN is valid the user is asked to speak the access code a second time to form a second utterance (plurality of second utterances) at step 222. The similarity between the first utterance (step 202) and the second utterance is compared to a threshold at step 224. In one embodiment the similarity is calculated using a weighted Euclidean distance. When the similarity is less than or equal to the threshold, the user is asked to speak the access code again at step 222. In this case the second and third utterances would be compared for the required similarity. In practice, the user would not be required to repeat the access code at step 222 more than once or twice and the system would then allow the user access. When the similarity is greater than the threshold, storing a combination of the two utterances as at step 226. In another embodiment both utterances are stored as reference utterances. Next access to the service is allowed at step 208. The reference utterance (plurality of reference utterances, reference voiced sounds) is used to verify the user the next time they access the service. Note that the speaker verification part of the access to the dial-up service in one embodiment uses all the techniques discussed for a verification process. In another embodiment the verification process only uses one of the speaker verification techniques. Finally, in another embodiment the access number has a predetermined digit that is selected from a first set of digits (predefined set of digits) if the user is a male. When the user is a female, the predetermined digit is selected from a second set of digits. This allows the system to determine if the user is suppose to be a male or a female. Based on this information, the male variance vector or female variance vector is used in the speaker verification process.

Thus there has been described an improved speaker verification method and a service that takes advantage of the speaker verification method. While the invention has been described in conjunction with specific embodiments thereof, it is evident that many alterations, modifications, and variations will be apparent to those skilled in the art in light of the foregoing description. Accordingly, it is intended to embrace all such alterations, modifications, and variations in the appended claims.

What is claimed is:

1. A method of accessing a service, comprising:
   receiving a speech signal to form a first utterance;
   recognizing the first utterance using speaker independent speaker recognition;

determining if a user has not used the service previously;
when the user has not used the service previously, requesting the user to enter a personal identification number; and
when the personal identification number is valid:
requesting the user to speak to form a second utterance;
when the first utterance and the second utterance are sufficiently similar,
generating a reference utterance based on the first utterance and the second utterance; and
providing access to the service.

2. The method of claims 1, further comprising
when the user has used the service previously, verifying the user based on the first utterance using a speaker verification system.

3. The method of claim 2, further including:
when the user cannot be verified, requesting the user enter the personal identification number; and
when the personal identification number is valid, providing access to the service.

4. The method of claim 2, wherein verifying the user based on the first utterance comprises
determining that the user is a male, when a preselected digit of at least one of the first utterance or the second utterance is detected.

5. The method of claim 4, further comprising
determining a similarity between another utterance and the reference utterance using a male variance vector.

6. The method of claim 5, further comprising
calculating a weighted Euclidean distance between the other utterance and the reference utterance.

7. The method of claim 4, further comprising
determining that the user is a female, when the preselected digit is not detected;
determining a similarity between another utterance and the reference utterance using a female variance vector when calculating a weighted Euclidean distance between the other utterance and the reference utterance.

8. The method of claim 1, wherein
the reference utterance is a generalization utterance of the first utterance and the second utterance.

9. The method of claim 1, further comprising:
determining a similarity between the first utterance and the second utterance; and
storing the reference utterance when the similarity meets a threshold.

10. The method of claim 9, further comprising:
when the similarity does not meet the threshold, requesting the user speakto form a third utterance;
determining a similarity between the first utterance and the third utterance;
when the similarity meets the threshold, generating another reference utterance based on the first utterance and the third utterance and storing the other reference utterance.

11. The method of claim 1, wherein the speech signal, the first utterance, and the second utterance are representative of a plurality of digits, and wherein recognizing the first utterance using speaker independent speaker recognition comprises recognizing the plurality of digits using speaker independent speaker recognition.

12. The method of claim 1, wherein the service is a dial-up service.

13. The method of claim 1, further comprising connecting to the user in response to the user having initiated communication with the service.

14. A method of providing access to a service, comprising:
requesting an access code be spoken, to form a first plurality of utterances;
recognizing the access code using a speaker independent voice recognition process;
when a user has not previously utilized the service, requesting the user speak the access code a second time to form a second plurality of utterances;
determining a similarity between the first plurality of utterances and the second plurality of utterances; and
when the similarity meets a threshold, storing a reference plurality of utterances based on the first plurality of utterances and the second plurality of utterances.

15. The method of claim 14, further comprising
allowing the user access to the service.

16. The method of claim 14, further comprising
when the similarity does not meet the threshold, allowing the user access to the service.

17. The method of claim 14, further comprising:
when the similarity does not meet the threshold, requesting the user to speak the access code to form a third plurality of utterances;
determining a similarity between the first plurality of utterances and the third plurality of utterances; and
when the similarity meets a threshold, storing a reference plurality of utterances based on the first plurality of utterances and the third plurality of utterances.

18. The method of claim 17, further comprising
allowing the user access to the service.

19. The method of claim 17, further comprising
when the similarity does not meet the threshold, allowing the user access to the service.

20. The method of claim 14, further comprising
when the user has used the service previously, verifying the user based on the first plurality of utterances using a speaker verification system.

21. The method of claim 20, further comprising
when the user is verified, allowing the user access to the service.

22. The method of claim 20, further comprising:
when the user is not verified, requesting the user to speak the access code to form a third plurality of utterances;
verifying the user based on the third plurality of utterances using a speaker verification system;
when the user cannot be verified based on the third plurality of utterances, and the first plurality of utterances form a valid access code, allowing the user access to the service.

23. The method of claim 14, further comprising:
when the user subsequently enters the number of the service, requesting the access code be spoken to form a third plurality of utterances;
verifying the user based on a similarity between the third plurality of utterances and the plurality of reference utterances using a speaker verification system.

24. The method of claim 14, further comprising connecting via the service to the user.

25. The method of claim 14, wherein the access code includes a plurality of numbers, and wherein recognizing the first utterance comprises recognizing the plurality of numbers.

26. The method of claim 14, wherein the service is a dial-up service.

27. A method of accessing a service, comprising:
  receiving a speech signal to form a first utterance;
  recognizing the first utterance using speaker independent speaker recognition;
  determining whether the user is verified based on the first utterance using a speaker verification system that has only two possible decisions;
  requesting the user to speak to form a second utterance:
  requesting the user to enter a personal identification number; and
when the personal identification number is valid, providing the user access to the service based on the first utterance, the second utterance, and the valid personal identification number.

28. The method of claim 27, wherein the two possible decisions of the speaker verification decision are verified and not verified.

29. The method of claim 27, wherein requesting the user to enter the personal identification number comprises requesting the user to enter the personal identification number in response to determining that the user is not verified.

30. The method of claim 27, wherein determining whether the user is verified comprises determining whether the user is verified in response to determining that the user has previously accessed the service.

31. The method of claim 27, further comprising receiving the personal identification number in response to the user speaking the personal identification number.

32. The method of claim 27, further comprising when the first utterance and the second utterance are sufficiently similar, generating a reference utterance based on the first utterance and the second utterance.

33. The method of claim 27, wherein providing the user access to the service based on the first utterance comprises providing the user access to the service based on recognizing the first utterance.

34. The method of claim 27, wherein the speech signal and the first utterance are representative of a plurality of digits, and wherein recognizing the first utterance using speaker independent speaker recognition comprises recognizing the plurality of digits using speaker independent speaker recognition.

35. The method of claim 27, wherein the service is a dial-up service.

* * * * *